United States Patent Office 3,394,775
Patented July 30, 1968

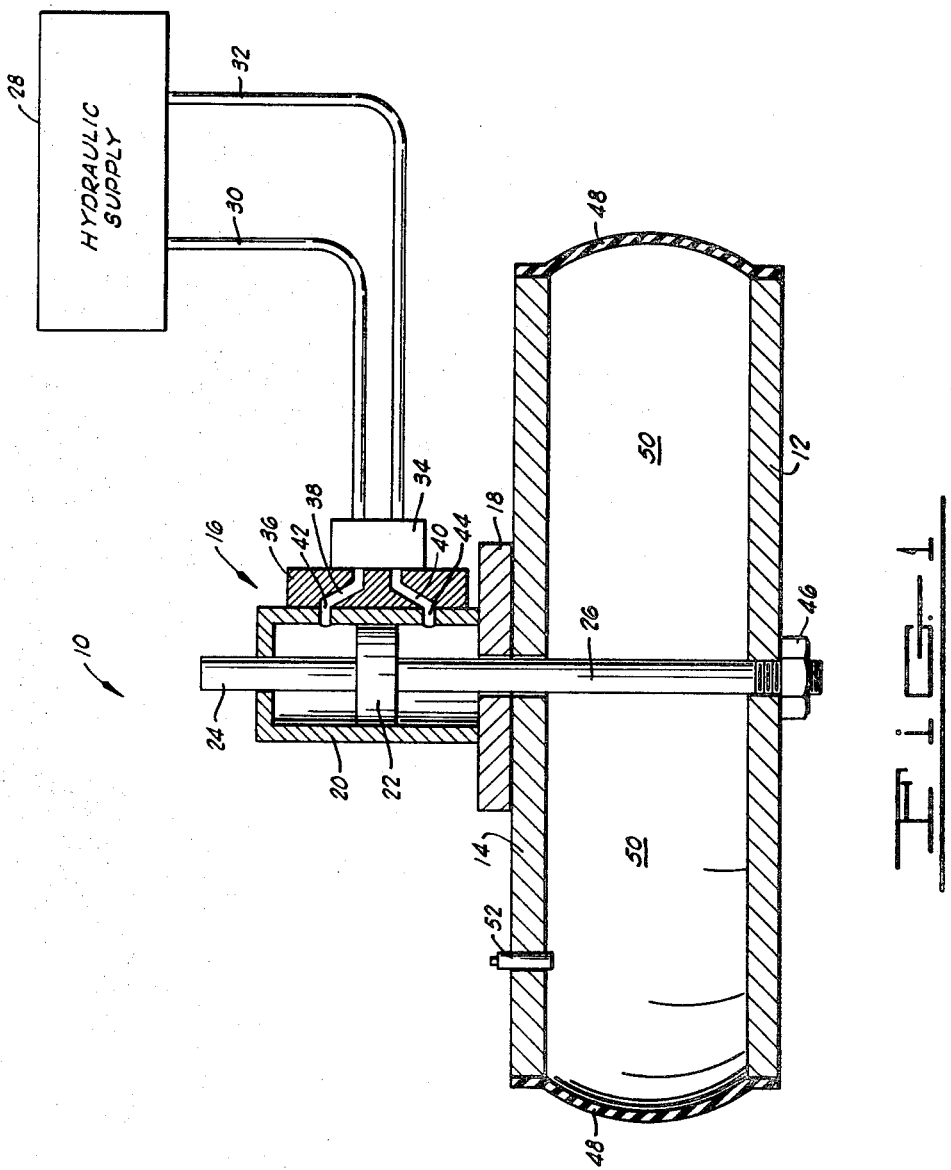

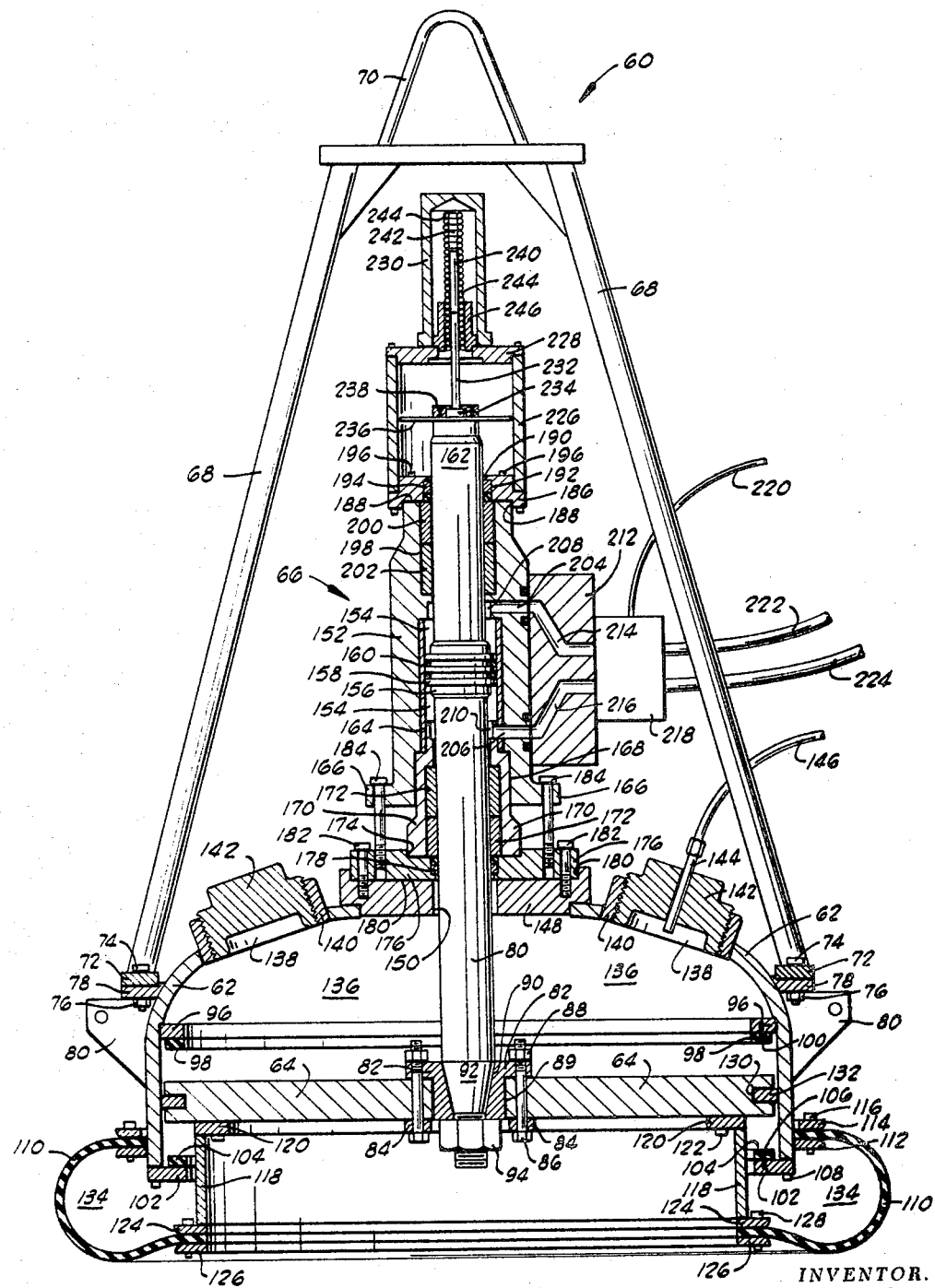

3,394,775
MARINE VIBRATION TRANSDUCER
Jimmy R. Cole and Frank Clynch, Ponca City, Okla., assignors to Continental Oil Company, Ponca City, Okla., a corporation of Delaware
Continuation-in-part of application Ser. No. 457,285, May 20, 1965. This application Nov. 4, 1966, Ser. No. 592,155
2 Claims. (Cl. 181—.5)

ABSTRACT OF THE DISCLOSURE

A pressure-compensated acoustical wave generator is disclosed having a means for slidably sealing a piston to a support member, and a flexible seal secured at one end to the outer periphery of said support member and at the other end to the outer periphery of a portion of said piston.

---

This application is a continuation-in-part of the co-pending patent application, Ser. No. 457,285, now Patent No. 3,329,930, entitled "Marine Vibration Transducer" filed in the name of Cole et al. and assigned to the present assignee.

This invention relates to improvements in the art of marine seismic prospecting and, more particularly, but not by way of limitation, it relates to an improved apparatus for generating acoustic energy vibrations in a water body.

The present invention contemplates a marine transducer which can be operated to produce acoustic energy input to a body of water, such that a seismic signal of precisely controllable characteristics can be imparted to the sub-terrain. In a more limited aspect, the present invention provides a vibrational transducer unit which consists of two pistons attached to a cylinder and piston rod, respectively, of a hydraulic linear actuator assembly. A flexible rubber cylinder or boot is slipped over these two pistons and securely fastened to each so that the air which is trapped between the pistons cannot escape into the water, nor can water flow into the air chamber. The vibrator unit can then be immersed in the water with the lower end or bottom of the reciprocating piston imparting a pressure wave to the water while the inner housing areas within the rubber enclosure are isolated and maintained at a predetermined air pressure such that maximum coupling of vibrational energy into the water medium is enabled.

Therefore, it is an object of the present invention to provide a vibrational transducer for imparting acoustic energy into a water body with maximum efficiency of transfer.

It is another object of the invention to provide a marine seismic energy vibrator which is constructed in a manner to allow increased piston displacement, such that low frequencies can be more efficiently generated.

It is a further object of the present invention to provide a vibrator device which is light in weight and easily transported and operated over a water covered area and which exhibits greatly increased mechanical reliability over prior types.

Finally, it is an object of the present invention to provide a marine transducer which allows a greater degree of flexibility as to the manner of construction and the configuration of interacting components such that there results an improved marine vibrator which exhibits a longer operating life and less demanding maintenance requirements.

Other objects and advantages of the invention will be evident from the following detailed description when read in conjunction with the accompanying drawings which illustrate the invention.

In the drawings:

FIG. 1 is a simplified cross-section of the invention showing the functional relationship of the major components of the device; and FIG. 2 is a vertical cross-section view of one form of marine vibrator which is constructed in accordance with the present invention.

In FIG. 1, the marine vibrator 10 consists of a first piston 12 which is vibrated relative to a second piston or plate member 14 by means of a hydraulic linear actuator or reciprocating ram assembly 16. Such hydraulic equipment as the ram assembly 16 is well known in the art and one suitable form of equipment is particularly disclosed in the aforementioned copending application.

The ram assembly 16 is securely mounted or fastened to the plate member 14 by means of a suitable mounting member 18. The ram assembly 16 comprises a cylinder member 20 having a hydraulic piston 22 and piston rod ends 24 and 26 reciprocating therein in response to hydraulic pressure applications. The hydraulic ram assembly 16 receives power from a suitable hydraulic supply 28 via input and exhaust lines 30 and 32 leading to a servo valve 34. The servo valve 34 then controls hydraulic pressure flow through manifold 36, including passages 38 and 40 to respective ports 42 and 44, for entry above and below hydraulic drive piston 22. Thus, the reciprocal application of hydraulic pressure alternately above and below the hydraulic drive piston 22 causes reciprocation of the respective rod-ends 24 and 26.

The piston rod-end 26 is slidingly received through the upper piston or plate 14, and in practice the sliding connection would be provided with a suitable high pressure seal to prevent loss of hydraulic pressure. The lower extremity of piston rod-end 26 is secured by suitable means, such as shown generally by a nut 46, so that the lower piston 12 is reciprocated with the hydraulic drive piston 22 and relative to the upper plate 14. A rubber boot or cylinder 48 is formed so that it encloses between the lower piston 12 and the upper plate 14. The rubber cylinder 48 is tightly clamped in air-tight relationship about the circumferences of each of the piston 12 and upper plate 14. Thus, the upper plate 14, lower piston 12, and rubber cylinder 48 define an air chamber 50 which can be regulated as to the amount of air pressure contained therein by means of an air passage 52 which leads through the upper plate 14.

In operation, the transducer assembly or vibrator 10 can be immersed in water at a desired marine shooting location. Water temperature and depth of immersion will be factors to be considered, since best operation is obtained when air chamber 50 is regulated via air inlet 52 so that it is equal in pressure to the static pressure of the immediately surrounding water. The hydraulic ram assembly 16 is then operated through a desired frequency sweep and duration of operation, the lower piston 12 sweeping out the same vibrational motions as driven by the piston rod-end 26.

While it would seem that the pressure which would be generated by the vibrator assembly 10 would be absorbed by the "soft" air chamber 50 which is next to the radiating surface, the effective mass of the water which is in contact with the rubber cylinder 48, and the compliance of the air in the air chamber 50, interact to form a resonant system which offers a high mechanical impedance at frequencies above resonance. The unit may be designed so that this resonant frequency is below the lowest required frequency of energy which is to be generated. Thus, an exemplary design might provide for such resonant frequency as low as two or four cycles per second, while the lowest desirable vibrational frequency to be generated in the output is on the order of seven to ten cycles per second. It can be demonstrated that even though there is acoustically "soft" material in the immediate vicinity of the radiating surfaces, the amount of radiated energy is in no way decreased.

The resonant frequency of the system derives from various factors. The effective mass load of the water, a direct function of the exposed area of the cylindrical diaphragm or cylinder 48, forms a resonant system through interaction with air within chamber 50. The compliance function of the air-diaphragm system depends upon the static pressure of the air and the voume of interior chamber 50.

FIG. 2 illustrates a marine vibrator 60 of specific design which embodies the teachings and functional advantages of the vibrator 10 of FIG. 1. Vibrator 60 includes a bell-shaped housing 62 which encloses a piston 64 in sliding relationship therein. A hydraulic ram assembly 66 is suitably secured atop the center portion of bell-shaped member 62 for the purpose of reciprocally driving the lower piston 64 as will be further described. The vibrator 60 is supported by means of a triangular frame member 68 having an upper fastening loop 70 and extending from a lower support ring 72. The support ring 72 is suitably secured by means of fasteners or bolts 74 and elastic stop nuts 76 to an annular mounting ring 78 which is welded around the circumference of the bell-shaped housing 62. Further securing members 80 may be welded about the bell-shaped housing 62 to enable additional fastening means for lateral manipulation of the vibrator 60 during the various movements which may be required in operation.

The piston 64, preferably formed of aluminum to minimize the total weight of the assembly, is secured on the end of piston rod 80 which extends downward from the hydraulic ram assembly 66. The piston 64 is fastened on the rod 80 by means of an annularly-shaped mounting block 82 and an associated clamping ring 84 which are bolted by bolts 86 and elastic stop nuts 88 to secure the piston 64 therebetween. The upper mounting block 82, preferably formed of flame-hardened steel, extends downward through a bore 89 formed in the central portion of the piston 64. A taper 90 is formed around the inner periphery of the upper mounting block 82 and it is shaped to mate with a corresponding taper portion 92 of the rod 80. Thus, it can be seen that when the mounting block 82 is wedged onto the tapered portion 92 of rod 80 by a suitable nut 94 threaded onto the lower end of the rod 80, the piston 64 will be rigidly secured in operative position. In practice, it has been found that eight equally circumferentially spaced threaded fasteners (bolts 86 and nuts 88) provide sufficient strength to clamp the piston 64 in the manner illustrated.

An annular ring 96 is welded around the inside of the bell-shaped housing 62 above the upper limit of movement of piston 64. A rubber bumper 98 is fastened about the under side of ring 96 by means of a plurality of circumferentially, equi-spaced and countersunk fasteners 100. A similar ring 102 bearing an upper rubber or neoprene ring 104, as positioned by fasteners 106, is secured about the bottom circumference of the bell-shaped housing 62 by means of a plurality of threaded fasteners 108. The resilient members 98 and 104 serve as bumpers at the upper and lower extremities of the stroke of piston 64 and design considerations should account for proper placement of the mounting rings 96 and 102 relative to the piston stroke.

In the FIG. 2 embodiment, the requisite rubber cylinder is formed by the tire-shaped resilient member 110 which is formed of suitable heavy rubber or neoprene, such as the order of one-half inch thickness. The upper edge of rubber enclosure 110 is secured in air-tight relationship about the outer edge of the bell-shaped housing 62 by means of a ring clamping arrangement. A mounting ring 112 is welded about the outer and lower extremities of the bell-shaped housing 62, and a ring-shaped clamping member 114 of similar diametric dimension clamps the rubber enclosure 110 to the clamping ring 112 by means of a plurality of threaded fasteners 116. The lower end of the rubber enclosure 110 is clamped to a cylindrical member 118 which, in turn, is securely clamped beneath the piston member 64. The cylindrical member 118 is formed to have an upper, inwardly flanged portion 120 which is affixed by means of fasteners 122 to the under side of the piston member 64, and the lower portion of cylindrical member 118 has an outwardly flanged portion 124; whereupon the lower edge of the resilient enclosure 110 is secured in air-tight relationship by means of a clamping 126 and a suitable plurality of fasteners 128.

The outer or circumferential surface of the piston member 64 is formed to have a groove 130 wherein a piston ring 132 is carried. The piston ring 132 may be a commercially available double-seal type of properly selected diameter and, while it does serve to maintain a somewhat tighter sliding coupling between the piston 64 and the inside of bell-shaped housing 62, it should not be an air-tight seal. Thus, communication or air flow is maintained between an annular interior space 134, immediately within the resilient enclosure 110, and the inner air chamber 136, within the bell-shaped housing 62.

Access holes 138, two of which are shown, are provided around the upper curved or shoulder portion of the bell-shaped housing 62. These have been formed by welding a coupling 140 in the housing member 62 and a threaded pipe plug 142 may be inserted therein to provide air-tight sealing. One of the pipe plugs 142 will also be fitted with an air inlet connector 144 for connection to an external air pressure line 146 in conventional manner. This air input serves to allow variation of the air pressure in the air chamber 136 and the lower enclosed portion 134 so that a particular operating pressure can be preadjusted. This pressure will depend upon the depth and mode of operation as will be further described below.

A support member 148 for the ram assembly 66 is welded around the upper extremity of the bell-shaped housing 62, and the member 148 has a circular opening 150 through which the piston rod 80 passes. The prime mover of the vibrator 60 may, of course, be any of the previously used types, e.g., electromagnetic, pneumatic or hydraulic; however, the particular embodiment is shown and described as having the hydraulic ram assembly 66 in conjunction therewith. The hydraulic linear actuator or ram 66 is of previously known design which has been employed with other land-type vibrator systems. This type of vibrator motor is the particular subject matter of U.S. Patent No. 3,073,659, issued on Jan 15, 1963 to the assignee of the present invention.

The hydraulic motor 66 is comprised essentially of a cylinder member 152 (and its end members and support members to be further described) which define a reaction chamber 154 wherein a piston 156 is reciprocated. The piston 156 is formed to have plural land portions 158 about its circumference, the land portions 158 being spaced such that selected, commercially available piston rings 160 can be inserted in the grooves therebetween. The hydraulic piston 156 is extended downwardly to form the lower piston rod 80 and it is also extended upward to form an upper piston rod 162.

The cylinder member 152 is formed to have a lining member 164 inserted in contact with its inside diameter and along a central portion of its length. The lower end of cylinder 152 is formed as a flange portion 166 and a counter-bored portion 168 which receives the cylindrically formed bearing enclosure 170 upwardly therein. The bearing enclosure 170 maintains a pair of bearing inserts 172 in firm, sealing contact with the lower piston rod 80 to thus provide a high pressure oil seal about the bottom extremity of hydraulic chamber 154. The lower or flange head portion of bearing enclosure 170 is then received within a recess 174 of a lower flange head 176. Lower flange head 176 is also suitably sealed by means of packing and/or O-ring means 178, and the flange head 176 is received downwardly within a recess 180 within the housing member 148 where it is secured therein by a plurality of threaded fasteners 182. Further structural support is provided by a plurality of threaded fasteners 184 which secure the flanged lower portion 166 of the cylinder member 152 downward to the lower flange head member 176 to provide rigid fixture of the hydraulic cylinder member 152 in proper alignment on the support member 148.

The upper end of the hydraulic ram assembly 66 is constructed in similar manner. An upper flange head 186 is formed with a cylindrical recess portion 188 which receives the upper end of the hydraulic cylinder 152. The upper flange head 186 also contains a cylindrical opening 190 through which the upper piston rod 162 is received, and a further counterboard portion 192 provides a volume in which suitable packing and/or O-ring sealing means 194 may be received to provide a fluid-tight seal of the hydraulic assembly. A plurality of screw-type fasteners 196 are utilized to secure the upper flange head 186 to the hydraulic cylinder 152.

The upper end of hydraulic cylinder 152 is formed with a counterbored interior portion 198 wherein a pair of bearing insert sleeves 200 and 202 are contained in abutting relationship. Various other sealing ring applications (not specifically shown in FIG. 2) may be suggested to the skilled artisan and such applications may be included as a matter of design choice.

The hydraulic cylinder 152 contains two horizontal passageways 204 and 206 which provide fluid ports or communications to the hydraulic reaction chamber 154. The upper port 204 communicates through a flow-way 208 to the upper volume of reaction chamber 154, while the lower port 206 connects through a similar flow-way 210 with the lower portion of chamber 154.

A manifold 212 which may be suitably affixed to the side of the hydraulic cylinder 152 provides the required fluid flow application to the hydraulic ram assembly 66. A first manifold fluid passage 214 connects to the upper fluid port 204, while a second fluid passage 216 connects to the lower port 206, and both of passages 214 and 216 connect to a servo valve 218 which is suitably secured in sealing relationship to the manifold 212. The servo valve 218, a conventional 4-way valve, is a well-known type of device and it is more particularly set forth in the aforementioned copending application. A suitable electrical control line 220 is extended downward from surface control equipment to the servo valve 218, and a pair of hose lines 222 and 224 serve as hydraulic input and exhaust lines, these also being supplied and controlled by conventional hydraulic equipment situated at the operating station.

An upper housing consisting of a cylindrical enclosure 226, circular plate member 228, and a topmost cylindrical enclosure 230, provide a protective covering for a linearly variable differential transformer, hereafter referred to as the LVDT. An LVDT is a feedback device which provides a control output to the surface equipment in the form of an electrical signal and this signal can be continually used for indicating and regulating the centering and limits of thrust of the piston 156. There are various reactive devices which can be used to perform the function of the LVDT; however, the one illustrated and described herewith is a commercially available type, e.g., Model No. 585 DT 1000, which may be obtained from the Sanborn Company of Waltham, Mass.

The LVDT assembly consists of a support rod 232 which a affixed to a mounting member 234 and a disc 236. The mounting member 234 is then secured atop the upper piston rod 162 by means of a suitable fastener 238, i.e., three fasteners 238 equilaterally arranged. The support rod 232 then carries a segment of magnetic armature core 240 so that it rides reciprocally within the core opening 242 of a transformer or coil member 244. A suitable support piece 246 secured to the circular plate 228 within the cylinder 230 serves to hold the LVDT coil 244 in a preselected position. The LVDT coil 244, being a well-known type, consists of one primary and two secondary windings and its control signal output may be taken off by suitable connector and cable means (not shown) for conduction to the surface control equipment. The structure and function of LVDT devices is more fully disclosed in the aforementioned co-pending application.

Operation

In operation of the specific embodiment of FIG. 2, the vibrator 60 is supported from a cable and, usually an isolation spring (not shown) by means of a suitable supporting bracket through the connecting loop 70. The inclusion of an isolation spring is common practice in marine seismic prospecting in order to damp any motion which may be transmitted from the vibrator 60 through the support cable to the supporting vehicle or craft. For most seismic prospecting applications, the usable or desired frequency range extends from about five cycles per second up to as high as 150 cycles per second and this should be considered when selecting the isolation spring.

When the vibrator unit 60 is lowered into the water, the pressure of the air in the air chamber 136, as well as the enclosed lower chamber 134, are adjusted to be equal to that of the static pressure of the surrounding water. This pressure adjustment will depend upon the depth of immersion of the vibrating unit 60. The interior pressure will be distributed equally in interior chamber 136 and annular space 134 as it forms a compliant air chamber.

Upon initiation under control of on-board equipment, the servo valve 218 can be caused to alternate input and exhaust hydraulic power through the manifold 212 to the hydraulic chamber 154 to drive the hydraulic piston 156 in a prescribed manner. That is, the desired upsweep or downsweep of frequency can be effected by so controlling the hydraulic fluid application. Thus, the hydraulic actuator assembly 66 periodically moves the piston 64 back and forth relative to the mounting plate 148 and this causes a pressure wave to be generated in the water by the piston 64. The high-pressure low-flow capability of the hydraulic ram assembly 66 is thereby transformed into a low-pressure, high-flow system by means of the larger piston cylinder (bell-shaped housing 62 and piston 64) assembly which is attached to the ram assembly 66 and driven in contact with the underlying water medium. Thus, a large volume of water is displaced periodically as the large area piston 64 expands and contracts. Such rapid displacement of water generates a pressure wave which then travels downward and outward in the water as acoustic energy.

The hydraulic high pressure line 222 and the exhaust line 224 would be enabled alternately; that is, the electronic control of the servo valve 218 by means of electrical cable 220 from the shooting boat would cause the desired actuation of the hydraulic ram assembly 66. Servo valve 218 would be under control of electrical signals generated in a suitable timing generator on-board the shooting boat so that it would alternate the high pressure and exhaust forces between the ports 204 and 206 of the hydraulic ram assembly 66 to cause reciprocation of the piston 156 in response thereto. Such alternation may be at varying rates depending upon the mode of operation selected for the particular shooting site. The LVDT equipment, coil 244 and reciprocating magnetic armature core 240 (and an electrical cable not shown) provide a continual feedback control signal to the surface equipment so that the centering and thrust of the hydraulic piston 156 can be maintained within the proper, pre-set limits. It should be understood, however, that various other commercially available devices may be used to exercise this servo control function.

It should also be understood that other types of prime moves, such as the electromagnetic type, are compatible and may be used with the particular marine vibrator. It is contemplated that in some areas, and for particular uses, this may be a desirable alternative. The individual elements or components of the vibrator may be formed from any of the generally used structural materials; however, the existing units are fabricated largely from steel with the vibratory piston member 64 being made of aluminum in an attempt to keep the overall weight of the vibrator unit to a minimum. It is also contemplated that some applications might benefit from particular contour shaping of the striking face of the vibrating piston, thereby eliminating or lessening cavitation effects. Note too that the various fastener elements employed in the invention may be conventional types, accepted rules of selection governing.

Changes may be made in the combination arrangement of elements as heretofore set forth in this specification and shown in the drawings; it being understood, that changes may be made in the embodiments disclosed without departing from the spirit and scope of the invention as defined in the following claims.

What is claimed is:

1. In a vibrational transducer for acoustic wave generation in a body of water wherein said transducer comprises a support member, a piston member, means for slidably sealing the periphery of said piston member to said support member, means connected to one of said members for adjusting the pressure of the air between the piston member and the housing to a value substantially equal to the surrounding water pressure, linear actuator means connected to the support member and to the piston member for reciprocating the piston member vertically relative to the support member; an improvement in said vibrational transducer comprising a portion of said piston member positioned in spaced relation from the support member, and a generally cylindrical, flexible seal having its one end sealingly secured around the outer periphery of the support member and its other end sealingly secured around the outer periphery of the portion of the piston member which is spaced from said support member.

2. A device as described in claim 1 wherein said portion of said piston member comprises a cylindrical member having one end attached to said piston member and the other end including means for securing said seal.

References Cited

UNITED STATES PATENTS

| | | | |
|---|---|---|---|
| 2,069,242 | 2/1937 | Graham | 340—8 X |
| 2,961,639 | 11/1960 | Atanasoff | 340—14 |
| 2,977,573 | 3/1961 | Mott. | |
| 2,978,669 | 4/1961 | Harris. | |
| 3,018,467 | 1/1962 | Harris. | |
| 3,143,999 | 8/1964 | Bouyoucos. | |
| 3,246,289 | 4/1966 | Mellen | 340—8 X |
| 3,258,738 | 6/1966 | Merchant. | |
| 3,263,208 | 6/1966 | Douglas et al. | |
| 3,280,938 | 10/1966 | Tullos | 181—0.5 |

BENJAMIN A. BORCHELT, *Primary Examiner.*

W. KUJAWA, *Assistant Examiner.*